Patented Jan. 18, 1927.

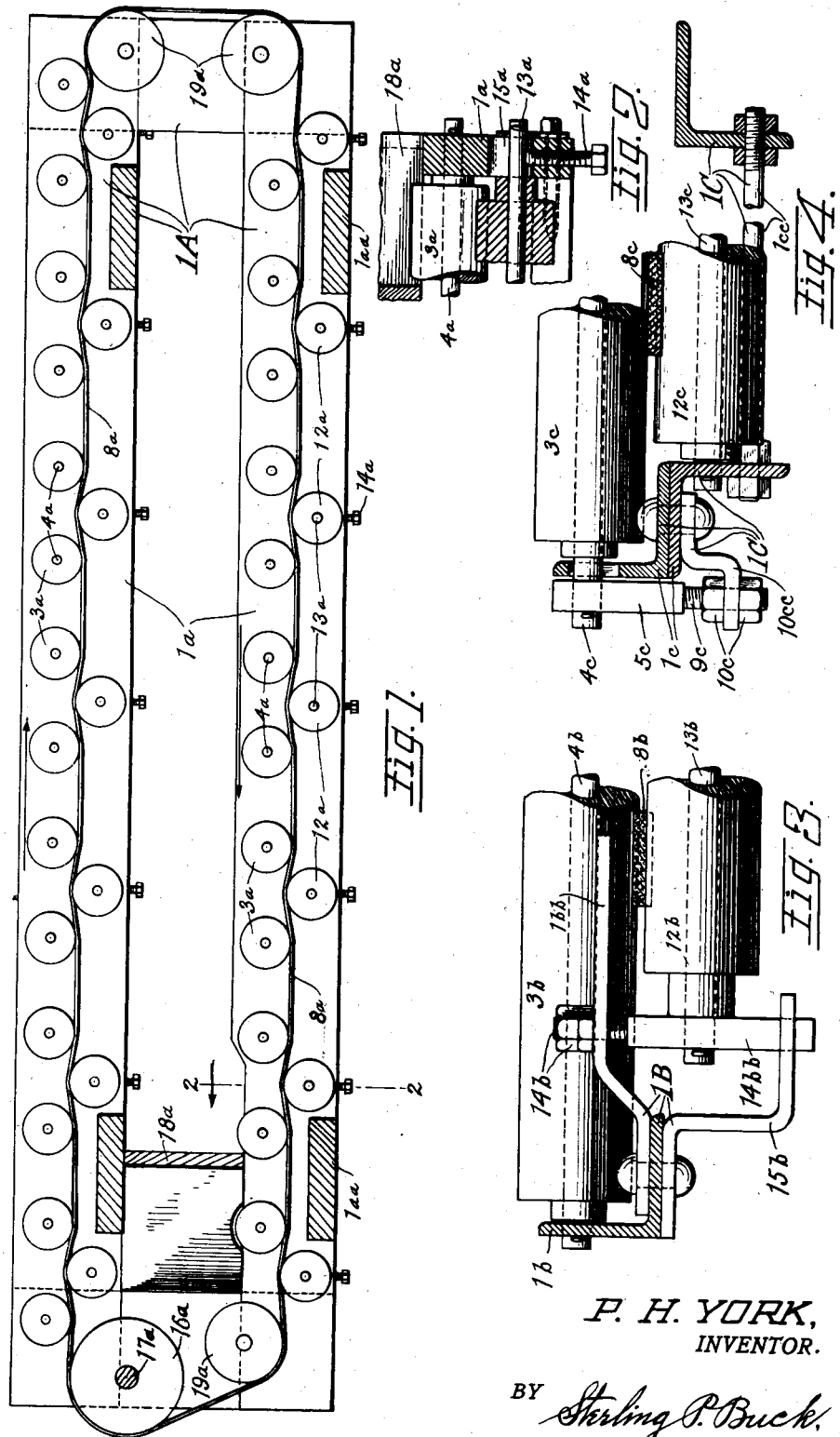

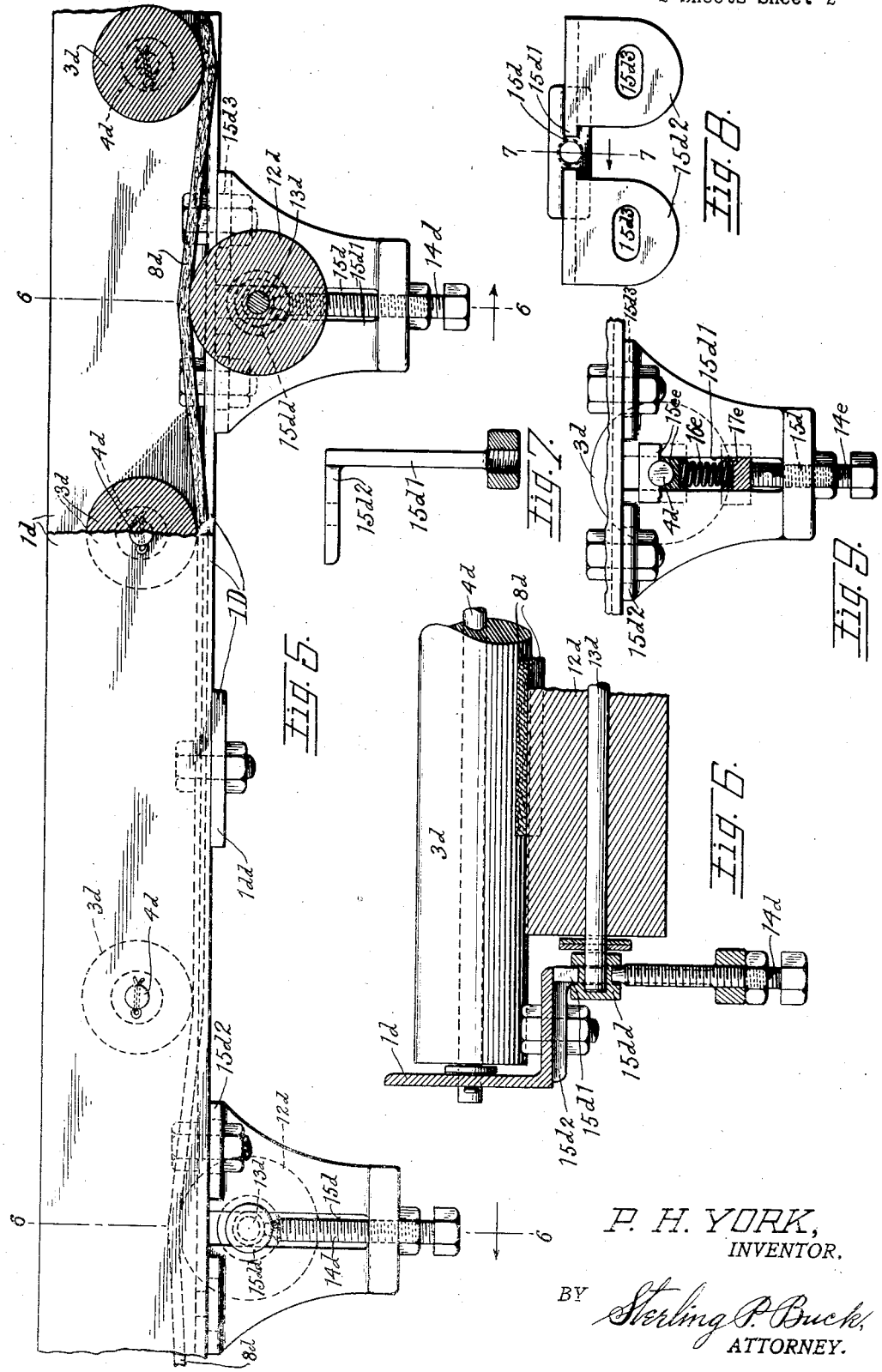

1,614,816

UNITED STATES PATENT OFFICE.

PHINEAS H. YORK, OF SOUTHPORT, INDIANA, ASSIGNOR TO LOGAN CO., A CORPORATION.

ADJUSTABLE ROLLER CONVEYER.

Application filed August 7, 1925. Serial No. 48,761.

This invention relates to conveyers, and especially to an improved adjustable roller-conveyer. The invention is useful in both power-driven conveyers, and gravity-driven conveyers of the type in which all the load-carrying rollers are in frictional engagement with a belt which controls their rate of rotary movement.

One object of the invention is to provide an adjustable means to hold the belt in an equal frictional engagement with all the load-carrying or article-carrying rollers, so each of these rollers will not slip against the belt, but will be preferably controlled for traveling at a rate of speed equal to that of the belt.

A further object is to provide a series of sub-rollers or rotary drums that support the belt at points between adjacent load-carrying rollers or drums, and hold the belt at a sufficient degree of tenseness and frictional engagement with the load-carrying rollers, to exert the necessary motive force or retardive force thereon, according to whether the belt is power-driven or gravity-driven; that is, whether the belt is driven by power other than the load carried on the conveyer, or by gravity in consequence of the series of load-carrying rollers being inclined at the part whereon the load is supported.

A further object is to provide simple, convenient and effective means to adjust the sub rollers upward and downward independently of one another, so, by adjusting one upward, and a second one downward, this second one is relieved of duty by the upwardly adjusted one which combines with the others in tightening the belt and holding it tight or tense, thus permitting the lowered roller to be removed and replaced by a new one, without stopping the conveyer or detrimentally affecting its operation.

A very important object of this invention is to provide an improved and comparatively simple and convenient bearing-hanger that is adjustable for moving the bearing in all directions laterally of its journal's axis, and is effective for securely holding the contiguous journal of the correlated belt-supporting roller in its various adjustments, whereby the belt can be trained to travel in a central or other desired relation with respect to the ends of the rollers.

Another very important object is to provide bearings and bearing-hangers for adjusting the sub-belt rollers, not only to press and increase pressure against the belt; but also independently adjustable to entirely eliminate pressure of a predetermined set or group of the sub-belt rollers against the belt, while another group of these sub-belt rollers maintain their pressure, whereby "live" groups and "dead" groups are provided in the same series of sub-belt rollers.

Another object is to provide an improved conveyer of the type mentioned and which includes a delivering section and a returning section in a unitary structure that is adjustable to different inclinations about the axis of its driving or retarding wheel.

Another object is to provide an improved conveyer of this type that can be constructed in various forms, from various structural materials, and have various adjusting means according to the locations and accessibilities of the respective conveyers when installed for use.

Other objects and important features are pointed out or applied in the following details of description, in connection with the accompanying drawings in which:

Figure 1 shows, in longitudinal vertical section, a simple form of the invention in which the conveyer-frame is formed of plain flat beams of wood or other material, the ends of the upper and lower beams being interlapped with the upper and lower ends of the end beams;

Figure 2 is an enlarged fragmental, vertical sectional view, the section being taken in the line 2—2 of Figure 1;

Figure 3 is a fragmental vertical sectional view of a modification of the invention;

Figure 4 is a fragmental vertical sectional view of another modification of the invention;

Figure 5 is a fragmental view of another modification of the invention, partly in side elevation, and partly in longitudinal vertical section;

Figure 6 is a fragmental, vertical sectional view along the lines 6—6, 6—6, of Figure 5;

Figure 7 is a detail view, in vertical section, along the line 7—7 of Figure 8, the same part being partly hidden in Figure 6;

Figure 8 is a top plan view of the bearing-guide shown in Figures 5, 6 and 7; and Figure 9 is a side elevation of a bearing-hanger such as shown in Figures 5, 6, 7 and 8, with the addition of a spring-seat and a spring therein for automatically adjusting the bearing, that is yieldingly pressing it upward so it automatically tensions the belt.

Referring to these drawings in detail, wherein similar reference characters correspond to similar parts throughout the several views: It will be seen that each form of conveyer includes a main frame, a driving or driven belt, a series of article-carrying rollers on the belt, a series of belt-carrying rollers under the belt, and means to adjust one series of the rollers laterally of the belt or towards and from the other series of rollers. For convenience of description, the form shown in Figures 1 and 2 will hereinafter be referred to as "form A"; that of Figures 3 and 4, "form B" and "form C" respectively; and that of Figures 5, 6, 7 and 8, "form D".

Each of the main frames ($1^A$, $1^B$, $1^C$ and $1^D$) comprises a pair of side members or beams, $1^a$, $1^b$, $1^c$ and $1^d$, secured in fixed spaced relation to one another by cross-beams ($1^{aa}$, $1^{bb}$, $1^{cc}$ and $1^{dd}$). The carrying rollers of each of the forms are indicated at $3^a$, $3^b$, $3^c$, and $3^d$ respectively, as they vary slightly in form, and their journals or axles are indicated at $4^a$, $4^b$, $4^c$ and $4^d$ respectively. The carrying rollers are either rotatable around their respective shafts or axles, or secured to and rotate with the axles, or provided with journals other than shafts that extend therethrough. However, by having the rollers loose on the shafts or axles, the latter may be withdrawn axially for removing and renewing the carrying rollers without distributing the fixed relation of the main frame members.

In form C, the load-carrying rollers are manually adjustable by means of a bearing member ($5^c$) having a screw-threaded end ($9^c$) provided with adjusting and securing nuts ($10^c$). The parts $9^c$ extend through apertured supporting brackets ($10^{cc}$), and the axles $4^c$ extend through vertical guiding slots ($11^c$) of the side bars $1^c$. These side bars are each preferably formed by uniting two angle-bars as shown.

In forms A, B and D, the axles of the belt-supporting rollers are vertically adjustable by manual means, that is, by screw-threaded means shown at $14^a$, $14^b$, and $14^d$. Guiding slots ($15^a$ and $15^d$) are provided for receiving the ends of the axles $13^a$ and $13^d$ respectively, and preventing horizontal movement thereof while guiding them in their vertical movements. The adjusting means ($14^b$) of form B includes a bearing-block ($14^{bb}$) which extends through an opening in a guiding member ($15^b$).

Referring now to form D, it will be seen that the axles $13^d$ have their ends seated in bearing-blocks ($15^{dd}$) whose bearings extend only partly through them, so the outer ends are closed and prevent axial movement of the axles, thus eliminating the necessity of boring or threading the axles for receiving cotter-keys, nuts or other securing means. These bearing-blocks, as shown, are adjustably mounted in bearing hangers that are adjustable mounted, the bearings are annularly grooved to receive the upright guides ($115^{d1}$) at opposite sides of the respective slots $15^d$. At the upper ends of these guides are provided horizontal apertured ears ($15^{d2}$) that are bolted or otherwise removably and adjustably secured to the side beams $1^d$, and by removing the bolts, these bearing-guides can be removed, thus permitting removal of the bearings $15^{dd}$ and of the axles $13^d$ and rollers $12^d$, for repairing or renewing any of these parts. For permitting adjustment of the bearing-hangers, their apertures $15^{d3}$ are elongated parallel with the path of travel of the belt, so they can be adjusted by loosening the bolts that hold them, then sliding them laterally of the bolts. By tightening the bolts these bearing-hangers are held in their proper adjustment for training the belt as desired. At the lower ends of the guides $15^{d1}$ are provided screw-threaded vertical bores, respectively, in which the respective screw-threaded adjusting members $14^d$ are seated. Each of the screw-threaded adjusting members may be provided with a lock-nut, to hold it in its different adjustments.

Referring again to form A (Figure 1): A driving or retarding pulley ($16^a$) mounted on a driving or retarding axle ($17^a$) which may be connected either to any appropriate form of motor or prime mover, or to any appropriate form of governor or retarder, according to whether the conveyer of this form is installed as a "power conveyer" or a "gravity conveyer". For use as a "gravity conveyer", it is tilted up or down around the axles of the shaft $17^a$, so the weight of the conveyed articles cause the rollers to turn, while the retarding means limits the rate of traveling movement. Assuming that loaded boxes (for instance) are traveling on the upper series of rollers $3^a$, in the direction of the upper arrow, the lower series of rollers $3^a$ may be employed for returning the empty boxes in the direction of the lower arrows, and a diagonally disposed plate ($18^a$) will deflect the empty boxes from the conveyer. Guiding pulleys ($19^a$) assist the pulley ($16^a$) in holding and guiding the belt in proper relation to the upper and lower series of load-carrying rollers.

Figure 1 is typical of each form of the invention, in the respect that the belt is mounted on rotary guiding and controlling wheels, pulleys, drums or the like, and is operable to travel along a path which is approximately horizontal, that is, either horizontal or more nearly horizontal than vertical, not that the entire path is approximately horizontal, but that such approximately horizontal path is included in the entire path of travel of the belt and is under the path of travel of the articles being conveyed. Each form also includes a frame formed of side-beams and cross-beams, the upper and lower rollers being journalled in bearings of said side-beams, that is, the bearings are either in or secured to the side beams, either fixed or adjustable. Each form is contemplated in the general combination shown in Figure 1.

Form B is a comparatively light and low-cost construction, suitable for conveying comparatively large, but light-weight articles; and it is conveniently adjusted from above. Form C is useful for heavier loads or where it is desired to make the adjustments from below. Form D is exceedingly convenient where the parts are subjected to the action of grit or other cause of wearing away of the axles, bearings, etc., requiring the easy and convenient removal and replacement of such parts.

In Figure 9, the adjusting screw 14$^e$ is shorter than that of Figures 5 and 6, and the bearings 15$^{ee}$ is slightly different from the bearing 15$^{dd}$, having a cup in its lower side as a seat for the adjusting spring 16$^e$. The lower end of this spring is seated in a vertically adjustable seat 17$^e$. The spring 16$^e$ constitutes a yielding tensioner for the belt, and the screw 17$^e$ constitutes a manually operable means to vary or regulate the tension of the spring 16$^e$.

These several forms of the invention do not by any means exhaust the inventive ideas and principles involved; so it is not intended to limit the invention to these forms; but I claim patent protection according to the broad principles as implied and claimed.

I claim the following:

1. A conveyer which includes a belt mounted to travel in a predetermined path, a series of load-carrying rollers journalled on stationary axes and in spaced relation to one another along a reach of said path for frictionally engaging the upper side of the belt, and a series of belt-supporting rollers journalled on stationary axes subjacent to said reach of the path for bearing against the under side of the belt at points continually between the load-carrying rollers and thereby pressing the belt against the latter and causing the belt to conform to an arc of the respective load-carrying rollers.

2. The structure defined by claim 1, and means for raising the belt-supporting rollers and thereby increasing the pressure of the belt against the rollers of both of said series.

3. The structure defined by claim 1, each of said belt-supporting rollers being provided with means to raise it with relation to said path, for increasing pressure of the belt on the rollers, said means also being operable to effect the lowering of the respective belt-supporting rollers substantially as described.

4. The structure defined by claim 1, and means to raise the belt-supporting rollers to different adjustments and to secure them in their respective adjusted positions, said means also being operable to effect the lowering of said belt-supporting rollers.

5. A conveyer which includes a belt mounted to travel in a predetermined path, a series of load-carrying rollers journalled in spaced relation to one another along a reach of said path for frictionally engaging the upper side of the belt, a series of belt-supporting rollers journalled subjacent to said reach of the path for bearing against the under side of the belt at points between the load-carrying rollers and thereby pressing the belt against the latter, a second series of load-supporting rollers, and a second series of belt-supporting rollers, these additional series being under the said reach and respectively above and below a lower reach of said path and frictionally engageable with the said belt.

6. A conveyer which includes a belt mounted to travel in a predetermined path, a series of load-carrying rollers journalled in spaced relation to one another along a reach of said path for frictionally engaging the upper side of the belt, and a series of belt-supporting rollers journalled subjacent to said reach of the path for bearing against the under side of the belt at points between the load-carrying rollers and thereby pressing the belt against the latter, each of said belt-supporting rollers being provided with means to effect its upward and downward adjustments independently of the other rollers, for relieving or increasing its frictional engagement with the belt, whereby different parts of the conveyer can be relieved from operation by the belt while other parts remain operatively engaged with the belt, thereby providing live-roller sections and dead-roller sections, substantially as specified.

7. The structure defined by claim 1, each end of each belt-supporting roller being provided with means for raising it independently of the other end, whereby these rollers can be adjusted to positions for training the belt towards one side or the other of the conveyer.

8. The structure defined by claim 1, each end of each belt-supporting roller being provided with means for adjusting it independently of the other end in a direction substantially parallel with the said reach, whereby these rollers can be adjusted to positions for training the belt towards one side or the other of the conveyer.

9. A conveyer which includes a belt mounted to travel in a predetermined path, a series of load-carrying rollers journalled in spaced relation to one another along a reach of said path for frictionally engaging the upper side of the belt, and a series of belt-supporting rollers journalled subjacent to said reach of the path for bearing against the under side of the belt at points between the load-carrying rollers and thereby pressing the belt against the latter, each end of each roller of a group of the belt-supporting rollers being journalled in a bearing which is provided with means to adjust it both laterally and longitudinally of the said path, for the purposes specified.

In testimony whereof I affix my signature.

PHINEAS H. YORK.